US006445845B1

(12) United States Patent
Sakata et al.

(10) Patent No.: US 6,445,845 B1
(45) Date of Patent: Sep. 3, 2002

(54) OPTICAL SWITCH

(75) Inventors: Tomomi Sakata; Hiroyoshi Togo, both of Tokorozawa; Fusao Shimokawa, Tokyo; Mitsuhiro Makihara, Higashiyamato, all of (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/558,152

(22) Filed: Apr. 26, 2000

(30) Foreign Application Priority Data

Apr. 27, 1999 (JP) .......................................... 11-119386
May 20, 1999 (JP) .......................................... 11-139529

(51) Int. Cl.$^7$ .............................................. G02B 6/26
(52) U.S. Cl. .......................................... 385/18; 385/16
(58) Field of Search ..................................... 385/16–18

(56) References Cited

U.S. PATENT DOCUMENTS 5,699,462 A * 12/1997 Fouquet et al. ................ 385/18
6,072,924 A * 6/2000 Sato et al. ..................... 385/18

OTHER PUBLICATIONS

Hanaoka et al. Low–Loss Intersecting Grooved Waveguides with Low ref. index dif. for a Self–Holding Optical Matrix Switch, May 1995, IEEE Transactions on components, packaging, and manufacturing technology–Part B, vol. 18, No. 2.*

Makoto Sato, "Electrocapillarity Optical Switch," IEICE Trans. Commun., vol. E77–B, No. 2, pp. 197–203, Feb. 2, 1994.

Yasuhide Nishida et al. "Waveguide Type Optical Switch," Japanese Patent Application No. 5–8854 (1993) Official Gazette of Japanese Patent Application Laid–open No. 6–222294, Aug. 12, 1994.

Hiroyoshi Togo et al. "Optical Switch and Method of Fabricating the Switch," Japanese Patent Application No. 9–141337 (1997) Official Gazette of Japanese Patent Application Laid–open No. 10–333062, Dec. 18, 1998.

Yoriko Hanaoka, Fusao Shimokawa, and Yasuhide Nishida, "Low–Loss Intersecting Grooved Waveguides with Low Δ for a Self–Holding Optical Matrix Swicth", IEEE Transaction on Components, Packaging and Manufacturing Technology–Part B vol. 18, No. 2 pp. 241–244 May 1995.

Jiro Koyama, Hiroshi Nishihara; "Optical Wave Electronics Engineering", Corona Co., Ltd. pp. 32–34, 1978.

Tomomi Sakata et al. "Waveguide Type Optical Part Having Insensitive To Polarization", Japanese Patent Application No. 10–238599 (1998) Official Gazette of Japanese Patent Application Laid–open No. 2000–066047, Mar. 3, 2000.

Tomomi Sakata et al. "Novel 2∓2 optical switch that has a self–latching function and its applications", ECOC '99, 26–30 Sep. 1999, Nice, France, pp. I–178–179.

T. Sakata et al. "Wavelength dependence of insertion loss caused by intermodel interference", Electronics letter, Aug. 5, 1999, vol. 35 No. 16, pp. 1–2.

* cited by examiner

Primary Examiner—Ellen E. Kim
(74) Attorney, Agent, or Firm—Venable; Robert J. Frank; Jeffri A. Kaminski

(57) ABSTRACT

An optical switch for switching a light path between two optical waveguides is provided. The switch has a slit formed diagonally cutting across the crossing point of crossing optical waveguides and a substance in the slit has a function of transmitting or reflecting an optical signal is selectively held in the slit. The slit is narrower than cores of the optical waveguides, and has a center line formed on a bisection of an interior angle between optical axes of the crossing optical waveguides. Thus, the substance in the slit serves to make optical intensity reflected to each of the optical waveguides uniform. Further, a crossing optical waveguide consists of a reflecting structure having its interior filled with air during reflection and the intersecting angle between the first group of optical waveguides is between 0 to 90 degrees and preferably substantially between 73 and 74 degrees.

18 Claims, 13 Drawing Sheets

OPTICAL SWITCH

This application is based on Japanese Patent Application Nos. 11-119386 (1999) filed Apr. 27, 1999 and 11-139529 (1999) filed May 20, 1999 in Japan, the contents of which are incorporated hereinto by reference.

BACKGROUND OF THE INVENTION

1. Field of the Invention

The present invention relates to an optical switch for an optical add drop multiplexer (OADM), an optical cross-connection (OXC) or an auxiliary system switching. The optical switch is used for light path routing/switching in a subscriber optical network such as a fiber to the desk (FTTD) or an optical local area network (LAN), and in an infrastructure optical network system such as optical interconnections in a communication processing apparatus.

Further, the present invention relates to an optical switch that is polarization insensitive within an optical communication wavelength bandwidth between 1.3 and 1.65 μm and an optical part comprising this optical switch.

2. Description of the Related Art

In these days of the advent of multimedia communication, much attention is being paid to a wavelength division multiplexing (WDM) type network in which all relevant operations such as switching and routing are performed using light, in order to accommodate a future increase in demands for transmission capacity. A key device for the WDM type network is an optical switch for the OADM or an optical switch for the OXC. The optical switch is an essential device providing flexibility and reliability for a subscriber optical network such as a FTTD or a LAN, and an infrastructure optical network system such as optical interconnections in a communication processing apparatus.

In a view of both good connectivity with optical fibers and mass production, thermo-optics (TO) switches using silica-based planar lightwave circuits (PLC) technology are generally used as optical switch for OADM or OXC. These TO switches are capable of switching in several microseconds. However, they have various problems; that is, they must be continuously supplied with an electric voltage in order to maintain the ON switching state (they have no self-latching function). Both their extinction ratio (>35 dB) and their crosstalk (<−35 dB) are not enough for the optical network systems, and their size are also large.

In contrast, mechanical switches are superior to the TO switch in the point of that they have the self-latching function and can easily achieve a high extinction ratio (>50 dB) and a low crosstalk (<−50 dB).

By way of examples, a mechanical switch has been proposed, which can switch a light path because mercury sealed in its slit is moved by powering up micro thin-film electrodes provided near a slit formed at a crossing point of optical waveguides crossing each other in an optical waveguide layer (Makoto Sato, "Electro capillarity Optical Switch," IEICE TRANS. COMMUN., VOL. E77-B, No. 2, PP. 197–203, FEBRUARY 1994). In addition, similar to the mechanical switch, an optical switch has been proposed, which can switch the light path because a magnetic fluid, an optical reflective fluid, an optical transmissible fluid sealed in its slit are moved by using a magnetic field generator provided near the slit, similar to the above mechanical switch (Yasuhide Nishide et al., "Waveguide Type Optical Switch," Japanese Patent Application No. 5-8854 (1993) [Official Gazette of Japanese Patent Application Laid-open No. 6-222294 (1994)]). Furthermore another optical switch similar to a mechanical switch has been proposed, which can switch the light path because refractive index matching liquid sealed in its slit is moved by heating micro thin-film heaters provided near the slit, similar to the above one (Hiroyoshi Togo et al. "Optical Switch and Method of Fabricating the Switch," Japanese Patent Application Laid-open No. 10-333062 (1998]). An optical switch using a number of such kinds of optical switches has also been proposed.

The conventional mechanical switches, however, switch the light path by utilizing the reflection wall on only one side of the slit fabricated at the crossing point of the crossing optical waveguides.

FIGS. 5A and 5B show an example of an optical selector switch for a light path switching comprised of a conventional mechanical switch. In FIG. 5A, reference numeral 1 designates crossing optical waveguides, reference numeral 2 designates a slit which crosses in a diagonal direction at each crossing point of the optical waveguides 1, and reference numeral 3 designates refractive index matching liquid sealed in the slit 2 that has a refractive index equal to that of cores of the optical waveguides 1.

Specifically, in the normal (transmitting) state shown in FIG. 5A, when the reflective index matching liquid 3 is present at the crossing point of the optical waveguides 1, optical incident signals from an input end a of the crossing optical waveguide (in a horizontal direction of the drawing) pass straight through the slit 2 and are emitted to an output end A, as shown by the broken line. However, in the switching (reflecting) state in FIG. 5B, when the refractive index matching liquid 3 moves away from the crossing point of the optical waveguides 1, optical incident signals from the input end a are reflected by the total internal reflection on one side wall of the slit 2 near the input end a, and then emitted to an output end B as shown as a dot-line of the drawing.

In addition, as shown in FIG. 5A, when the refractive index matching liquid 3 is present at the crossing point of the optical waveguides 1, optical incident signals from an input end b of the crossing optical waveguide pass straight through the slit 2 and are emitted to the output end B. However, as shown in FIG. 5B, when the refractive index matching liquid 3 moves away from the crossing point of the optical waveguides 1, optical incident signals from the input end b cannot be totally reflected and propagated to the output end A because the side wall of the slit 2 near the input end b side is offset from an ideal reflection plane (a vertical plane located on a bisector of an interior angle at the crossing point of the optical waveguides 1) toward the input end b by a distance corresponding to the width of the slit 2. Thus, in this case, due to a decrease in an amount of the light propagated from the input end b to the output end A, the difference between the intensity of the optical signal outputted from the output end A and the intensity of the optical signal outputted from the output end B increases.

To eliminate the difference in optical signal intensity between the output ends A and B, an additional system for amplifying or attenuating the optical signal reflected by or passed through the slit is required, so that the entire structure of the optical switch becomes substantially complicated. This is disadvantageous in that fabrication cost of the optical switch increases and in that the price of the optical switch itself rises.

Thus, a single conventional mechanical switch provides only two inputs and two outputs (two bar functions) in the transmitting state, provides one input and one output (one cross function) in the reflecting state, and cannot work as 2×2 switch having two bar functions and two cross functions.

Accordingly, to construct a 2×2 optical switch using conventional mechanical switch elements, three or more mechanical switch elements, must be combined together in a form as shown in FIGS. 6A and 6B. FIG. 6A shows the normal (transmitting) state, while FIG. 6B shows the switching (reflecting) state. Moreover, to construct an optical array or a matrix switch using N combined 2×2 optical switches, 3N or more of the above 2×2 optical switches must be combined together. Consequently, to construct a large-scale optical matrix switch, a large number of switches are conventionally required, preventing size reduction.

As described above, the conventional optical switches are disadvantageous in that a 2×2 optical switch cannot be constructed using a single optical switch and in that the size of a large-scale optical matrix switch cannot be reduced.

The present invention is created in view of the above problems of the prior art. It is a first object thereof to provide a mechanical switch which is capable of a cross/bar function of a 2×2 optical switch through a single switch element, and which reduces a size of a large-scale optical matrix/array switch.

Furthermore, optical signals having different polarized lights depending on different wavelengths arrive at an optical node on this WDM type network. In this case, if the polarization dependence exists in a waveguide type optical part installed on the node, the optical signals have a varying intensity depending on each wavelength, the varying intensity may cause a primary factor degrading the flexibility and reliability of the entire network. Thus, the waveguide-type optical part arranged on the node must be insensitive to polarization.

However, the sufficient examination has not been done for the polarization dependence in relation to a waveguide type optical part including an m×n optical waveguide having a first group of plural (m) optical waveguides each having a parallel optical axis and a second group of plural (n) optical waveguides each having a parallel optical axis and crossing the first group of optical waveguides, and having reflective structure which can switch optical signals from the first group of optical waveguides to the second group of optical waveguides.

For the above waveguide-type optical parts with the reflective structure, we calculated, taking the Goos-Hänchen shift effect in the reflecting state into account, the distance of light soaked into a physical reflection plane (side wall) of the reflective structure: a phenomenon in which the light soaks into the physical reflection plane by a certain distance. Then, we have found that the distance by which the light soaks varies by the direction of a polarized incident light, that is, the polarization dependence exists.

Based on this discovery, it is a second object of the present invention to provide an optical part, particularly, an optical switch that can reduce the polarization dependence causing by a difference in the distance of light soaked which varies with the direction of the polarized light.

SUMMARY OF THE INVENTION

To attain the above first object, in an optical switch according to a first aspect of the present invention, a center line of a slit having two opposed side walls (physical reflection planes) is aligned with a bisector (ideal reflection plane) of an interior angle at a crossing point of optical-axis center lines of crossing optical waveguides, and a Goos-Hänchen shift effect on a light reflection plane (optical reflection plane) caused by light soaking is positively used to reduce an amount of positional deviation of the optical reflection plane from the ideal reflection plane. Thus, this optical switch utilizes both opposed side walls of the slit fabricated at the crossing point of optical waveguides crossing each other in an optical waveguide layer as the physical reflection plane that freely switches a light path of the crossing optical waveguides by actively utilizing the Goos-Hänchen shift effect. The optical switch can reduce the positional deviation of the reflection plane, and thereby simultaneously can switch the light paths in the crossing optical waveguides with a low loss. In addition, since the slit of the optical switch is located at the center of the crossing point of the crossing optical waveguides, and the optical switch uses both side walls of the slit as reflecting wall surfaces of the same characteristics, lights reflected by these side walls of the slit have an equal intensity.

Therefore, according to the first aspect of the present invention, this optical switch can provide a 2×2 optical switch function through a single element without the needs for any amplifier or attenuator for equalizing the light intensity. Accordingly, the size of the 2×2 optical switch, which conventionally requires three or more optical switches, can be reduced to a third part or less, thereby enabling this optical switch to be implemented at a low price. Further, an optical switch providing the 2×2 switch function can be constructed using optical switch elements with a third part of elements that is required for the conventional optical switch.

In addition, according to a variation of the first aspect of the present invention, the above slit is disposed at all or some of the crossing points between a number of optical waveguides not crossing one another and a number of other optical waveguides not crossing one another in the optical waveguide layer so that the light path can be switched and routed between the crossing optical waveguides. Consequently, the size and number of the required switches can be reduced to by one-third part or less compared to the prior art, and the size of a large-scale optical array switch and a large-scale optical matrix switch can also be diminished.

In addition, compared to the conventional 2×2 optical switch, which requires three or more optical switch elements, according to the present invention, the frequency of reflections required to switch light path decreases by one-third part or less, hence reflection loss caused by light path switching can be lessened by one-third part or less. Therefore, when an optical array switch or an optical matrix switch is constructed by using the optical switch according to the present invention, the total reflection loss of the optical switch can be reduced by one-third part or less.

As described above, the use of the optical switch according to the first aspect of the present invention enables the realization of a miniaturized 2×2 optical switch and large-scale optical array/matrix switches with a low loss.

To attain the above second object, an optical switch according to a second aspect of the present invention consists of a crossing optical waveguide with reflective structures in m×n optical waveguides that are configured like a grid and include a first group of (m) optical waveguides each having a parallel optical axis and a second group of (n) optical waveguides each having a parallel optical axis and crossing the first group of optical waveguides individually, the reflective structures (ex. Slits) can switch optical signals from the first group of optical waveguides. The reflective structure's interior is filled with air in the reflection state, cores of the first and second groups of waveguides have a refractive index equivalent to that of glass, an intersecting angle between the first and second group of optical waveguides is set based on the predetermined equation described below and is specifically limited between 0 and less than 90 degrees. This configuration can reduce the difference of the distance of light soaking which varies according to the polarizing direction and which makes the polarization dependent of the reflection loss. This configuration can provide a waveguide type optical part, particularly, an optical switch having a polorization insensitive that is negligibly level for an optical communication wavelength bandwidth 1.3 to 1.65 $\mu$m.

However, the intersecting angle between the first and second group of optical waveguides is set to be low angle, optical signals from the first (second) group of optical waveguides are diffracted to the second (first) group of optical waveguides, resulting in a debased extinction ratio. Therefore, the intersecting angle between the first and second group of optical waveguides should be possibly taken a maxim degree within the above range. Preferably, in the waveguide type optical part, particularly, the optical switch, by limiting the intersecting angle between the first and second group of optical waveguides to 73 to 74 degrees, the difference in the distance of light soaking which varies according to the polarizing direction and which makes the polarization dependence of reflection loss is lessened to a negligible level, thereby providing a waveguide type optical part, particularly, an optical switch has a polarization insensitive that is negligibly level for an optical communication wavelength bandwidth 1.3 to 1.65 $\mu$m.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The configurations and operations of optical switches according to the embodiments of the present invention will be described below with reference to the drawings.
(First Embodiment)

Figure 1:
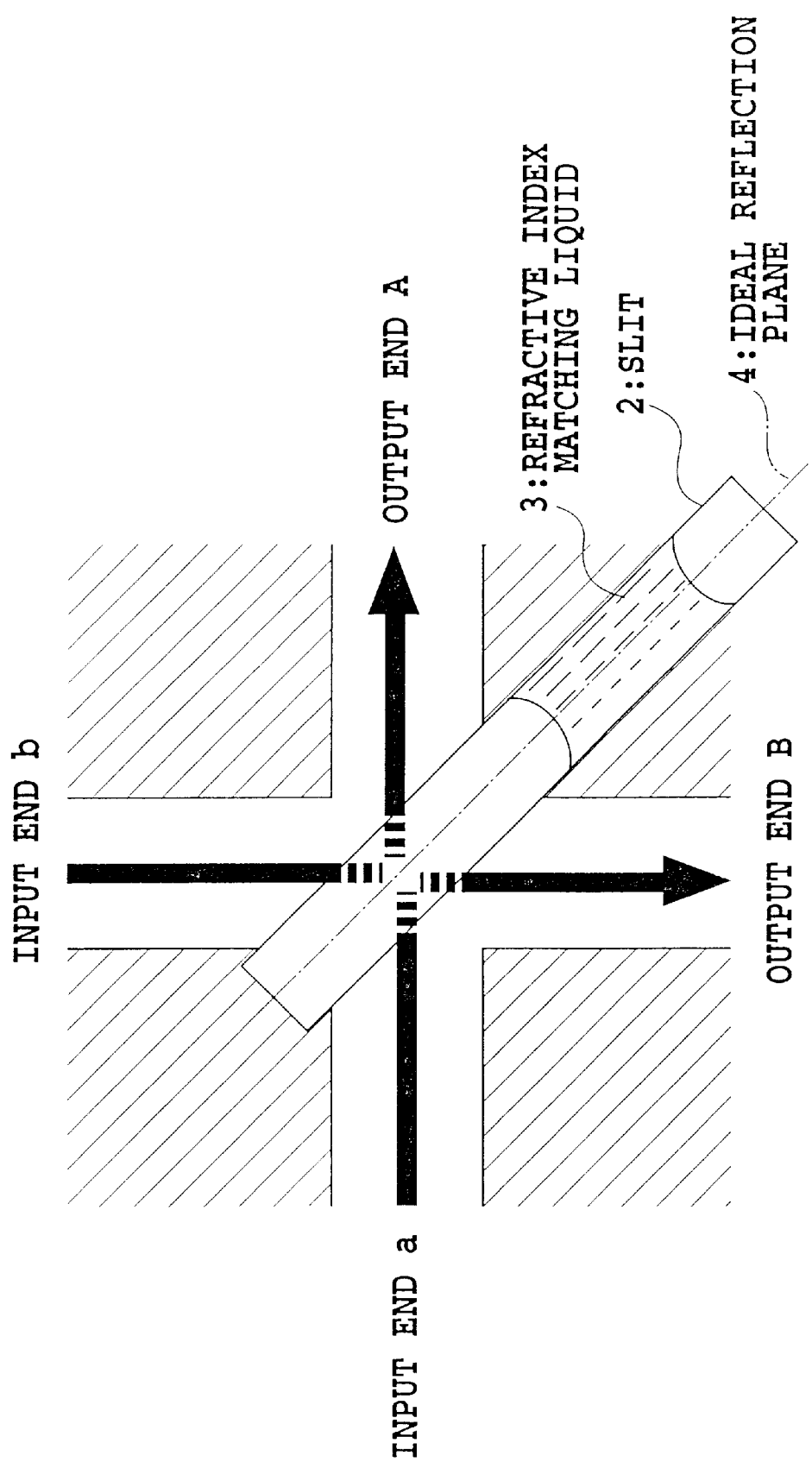
FIG. 1 is a schematic configuration diagram showing a structure of an optical switch according to a first embodiment of the present invention that is capable of the functions of a 2×2 optical switch.

FIG. 1 shows an optical switch having the functions of the 2×2 optical switch according to the present invention. In this figure, reference numeral 4 denotes an ideal reflection plane located on a bisector of an interior angle at a crossing point of optical waveguides 1 (this is an ideal reflection plane for light propagating through the crossing optical waveguides). The optical waveguides 1 are fabricated from an inorganic material such as silica or an organic material such as an epoxy resign, on a support substrate of silicon or the like. Silica-based optical waveguides are formed by depositing a film with a thickness corresponding to the optical waveguide on the substrate by means of a flame hydrolysis deposition (FHD) method, and then carrying out a photolithography process or a dry etching process. In addition, epoxy resin-based optical waveguides are formed by depositing a film with a thickness corresponding to the optical waveguide on the substrate by means of spin coat or the like, and then carrying out the photolithography process or the dry etching process.

The pair of optical waveguides 1, cross each other, and a slit 2 is formed to be located diagonally relative to the optical waveguides 1 passing through central to their crossing point and to have two perpendicular opposed side walls. The slit 2 is formed by a dry etching process so as to have a sufficient depth to block off all light propagated through the optical waveguide 1, and a slit center line is located on the bisector of the interior angle at the crossing point so that light incident from an input end a and b of the optical waveguide 1 is totally reflected to an output end B or A, respectively. That is, the slit 2 is formed so that the distance from both sides of the slit to the ideal reflection plane 4 are equivalent to each other.

The slit 2 is partially filled with a refractive index matching liquid 3 such as silicone oil which has a refractive index equal to that of a core of the optical waveguide 1. When the refractive index matching liquid 3 is present at the crossing point of the optical waveguides 1, optical incident signals from the input end a (b) pass straight through the slit 2 and output straight to the output end A (B). In contrast, when the refractive index matching liquid 3 moves away from the crossing point, since the slit 2 at the crossing point is a cavity filled with air, optical incident signals from the input end a (b) are totally reflected on the corresponding side wall of the slit 2 and output to the output B (A).

As shown in FIG. 1, when the center line of the slit aligns with the bisector of the interior angle at the crossing point of the optical waveguides 1 (this bisector corresponds to the ideal reflection surface 4), the position of the corresponding side wall of the slit 2 is offset from the ideal reflection plane 4 by a distance corresponding to half of the width of the slit 2. Due to the Goos-Hänchen shift effect, however, the optical reflection plane shifts from the side wall of the slit 2 to the ideal reflection plane 4 side.

Then, utilizing this shift distance (distance a of reflection plane shift caused by the Goos-Hänchen shift effect), the optical reflection plane can be set at a location near the ideal reflection plane 4. Therefore, when the shift distance is designed to equal half of the slit width, the optical reflection plane reflecting the incident lights from input end a(b) can be made to agree with the ideal reflection plan 4.

For example, when the core of the optical waveguide 1 has a refractive index of 1.45435, the intersecting angle between the optical waveguide 1 and the slit 2 ($\phi$) should be about 46 degrees or smaller in order to allow light to be totally reflected by the corresponding side wall of the slit 2, based on the Snell's law. On the other hand, the shift distance caused by Goos-Hänchen shift effect the optical reflection plane ($\delta$) depends on the intersecting angle between the optical waveguides 1 and the slit 2. The relationship between the Goos-Hänchen shift distance of the optical reflection plane ($\delta$) and the intersection angle between the crossing waveguides is shown in FIG. 2.

Figure 2:
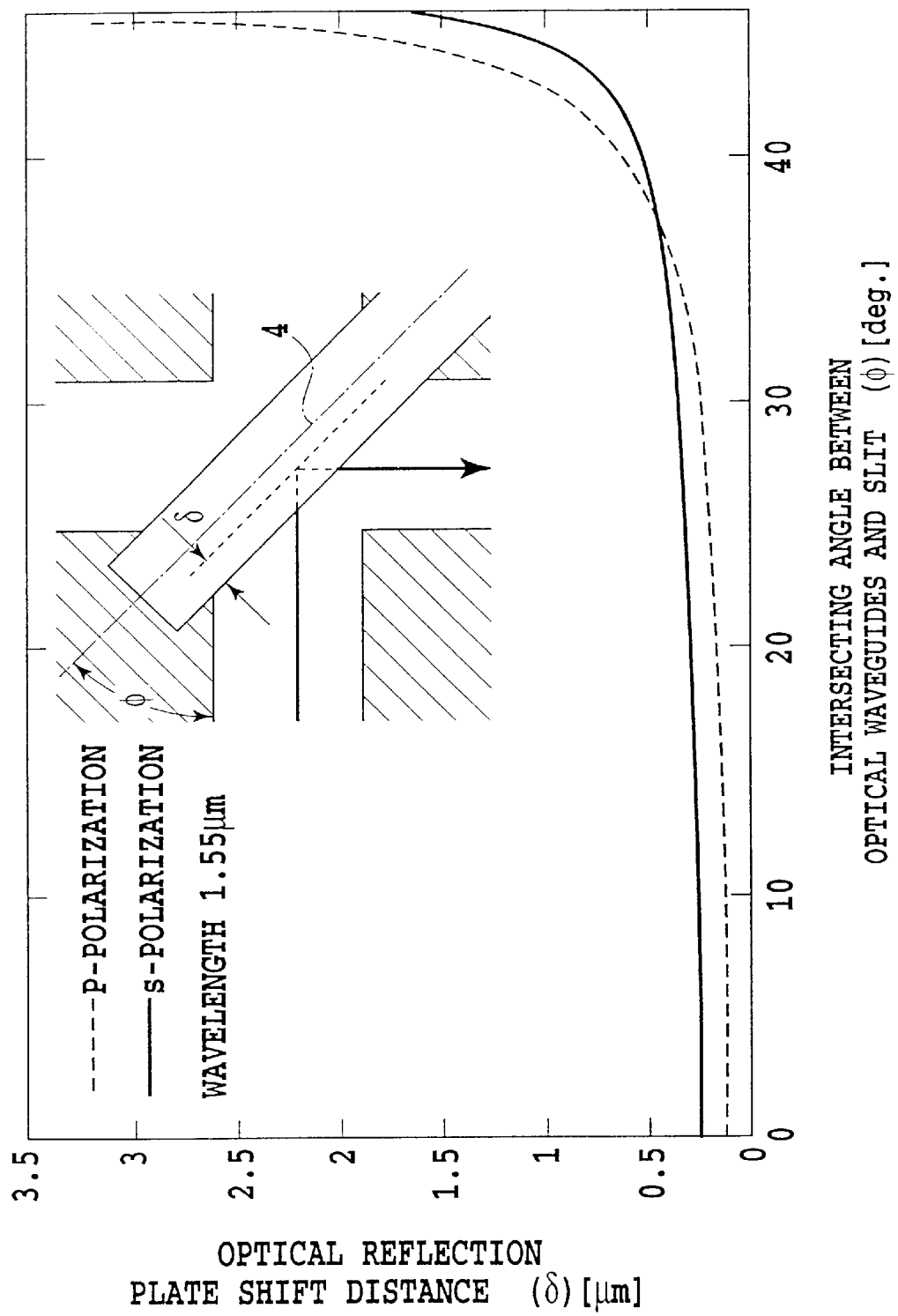
FIG. 2 is a graph showing the polarization dependence of an intersecting angle between an optical waveguide and a slit ($\phi$) on the shift distance of an optical reflection plane ($\delta$) caused by Goos-Hänchen shift.

Then, if the intersecting angle is designed to be 45 degrees, the incident lights are soaking into the corresponding both side walls of the slit by a distance of about 2 $\mu$m caused by the Goos-Hänchen shift effect, as shown in FIG. 2. Hence, when the width of the slit is designed to be about 2 $\mu$m, the optical reflection plane of light propagating through the crossing optical waveguides agrees with the ideal reflection plane 4.

Figure 3:
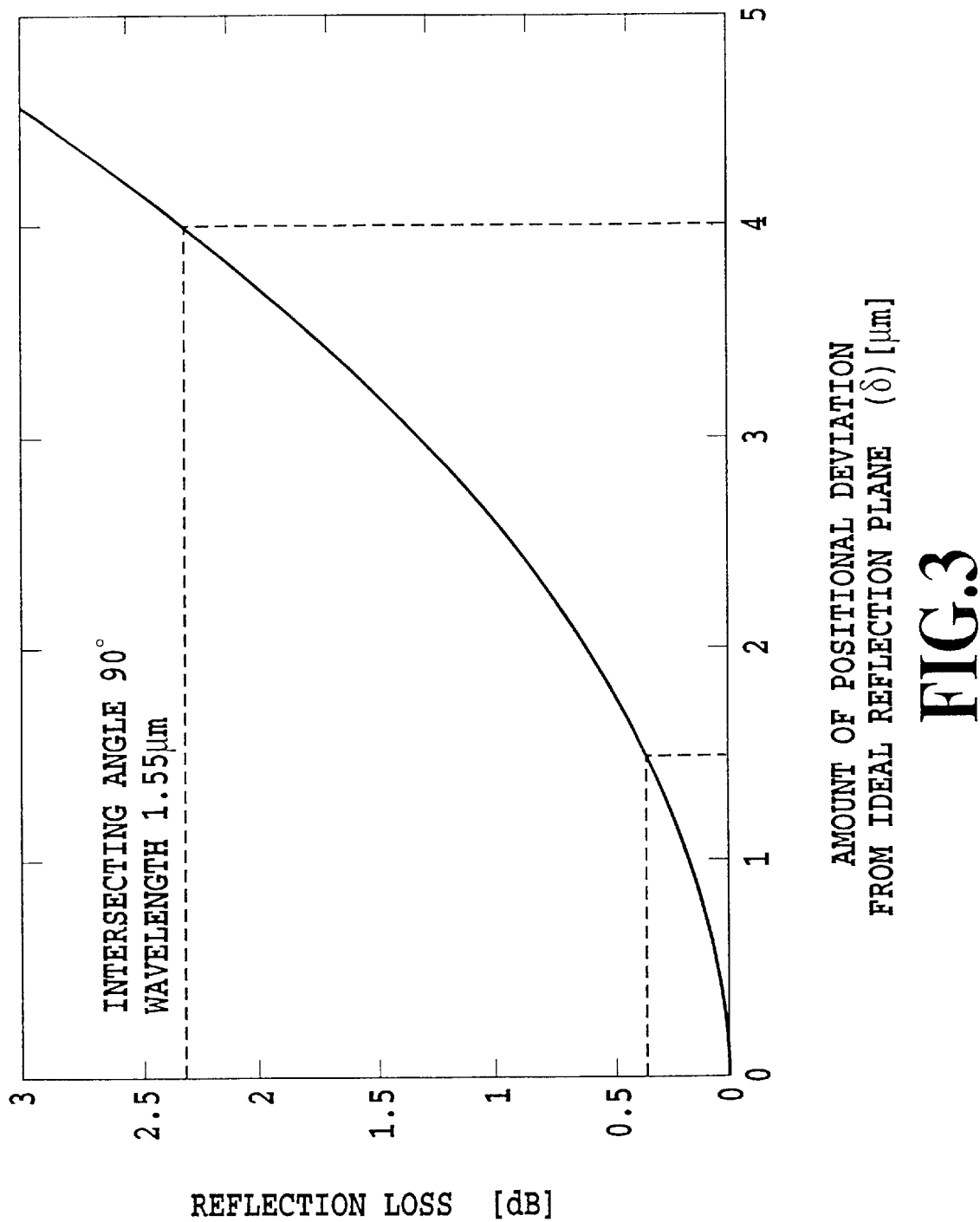
FIG. 3 is a graph showing a relationship between an amount of positional deviation of the optical reflection plane from an ideal reflection plane and optical loss.

FIG. 3 shows the relationship between the amount of the positional deviation of the optical reflection plane from the ideal reflection plane 4 and the reflection loss of propagation light caused by the amount of the positional deviation. FIG. 3 indicates that the absence of the positional deviation of the optical reflection plane from the ideal reflection plane 4 serves that the reflection loss resulting from amount of the positional deviation of the optical reflection plane will be negligible in practice. That is, by designing the slit width to be equal to twice the distance of Goos-Hänchen shift, a 2×2 optical switch with a low loss can be implemented.

For single-mode optical waveguides, Hanaoka et al. of NTT (NIPPON TELEGRAPH AND TELEPHONE CORPORATION) have implemented a deep vertical slit of 5 $\mu$m slit width and 40 $\mu$m slit depth (Yoriko Hanaoka, Fusao Shimokawa, and Yasuhide Nishida, "Low-Loss Intersecting Grooved Waveguides with Low Δ for a Self-Holding Optical Matrix Switch", IEEE TRANSACTION ON COMPONENTS, PACKAGING AND MANUFACTURING TECHNOLOGY-PART B VOL 18 NO 2 pp. 241–244 MAY 1995).

Then, when the slit width is 5 $\mu$m, the amount of the positional deviation of the optical reflection plane from the ideal reflection plane 4 corresponds to 1.59 $\mu$m. As shown in FIG. 3, when the amount of posisional deviation is 1.5 $\mu$m, the reflection loss of propagation light caused by the positional deviation of the optical reflection plane from the ideal reflection plane 4 is 0.5 dB or less, and the insertion loss of the optical switch can be reduced to below 1 dB with the propagation loss of the optical waveguides taken into account.

The insertion loss of commercially available representative thermo-optical switches (TO switches) is about 3 dB. To keep the insertion loss of the optical switch according to the present invention to below 3 dB, the amount of the positional deviation of the optical reflection plane from the ideal reflection plane 4 may be lessened to 4 $\mu$m or less, as seen in FIG. 3. Namely, by designing the slit width to be 10 $\mu$m or less and using the arrangement according to the present invention in FIG. 1, the optical switch can be implemented which is subject to a lower loss than the TO switches and wherein a single optical switch can provide the functions of 2×2 optical switch. Accordingly, since it seems that the present feasible slit width is 5 $\mu$m, the optical switch according to the present invention is sufficiently practical.

Although the above description refers to the single-mode optical waveguide, the optical switch according to the present invention is obviously applicable to multi-mode optical waveguides.

Since the mode field diameter of light propagating through a multi-mode optical waveguide is much larger than that in a single-mode optical waveguide, the reflection loss in the multi-mode optical waveguide, which is caused by the positional deviation from the ideal reflection plane, is very low. For the multi-mode optical waveguide, if, for example, the amount of the positional deviation of the optical reflection plane from the ideal reflection plane is 1.5 $\mu$m, the reflection loss is 0.2 dB or less. Consequently, the use of the optical switch according to the present invention can implement a multi-mode optical switch with a low loss.

Figure 4:
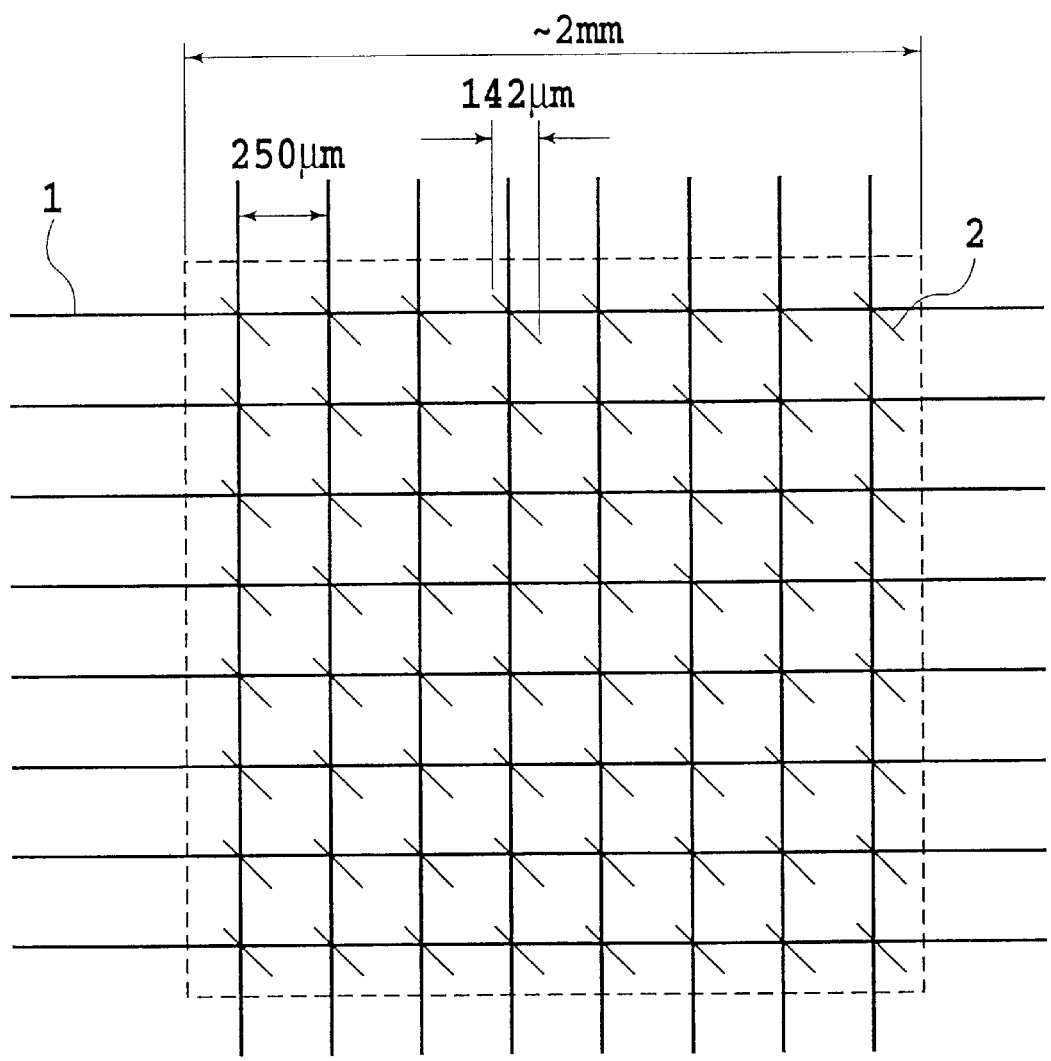
FIG. 4 is a schematic configuration diagram showing a large-scale optical matrix switch comprising optical switches according to the present invention arranged in the form of a matrix.
Figure 5A:
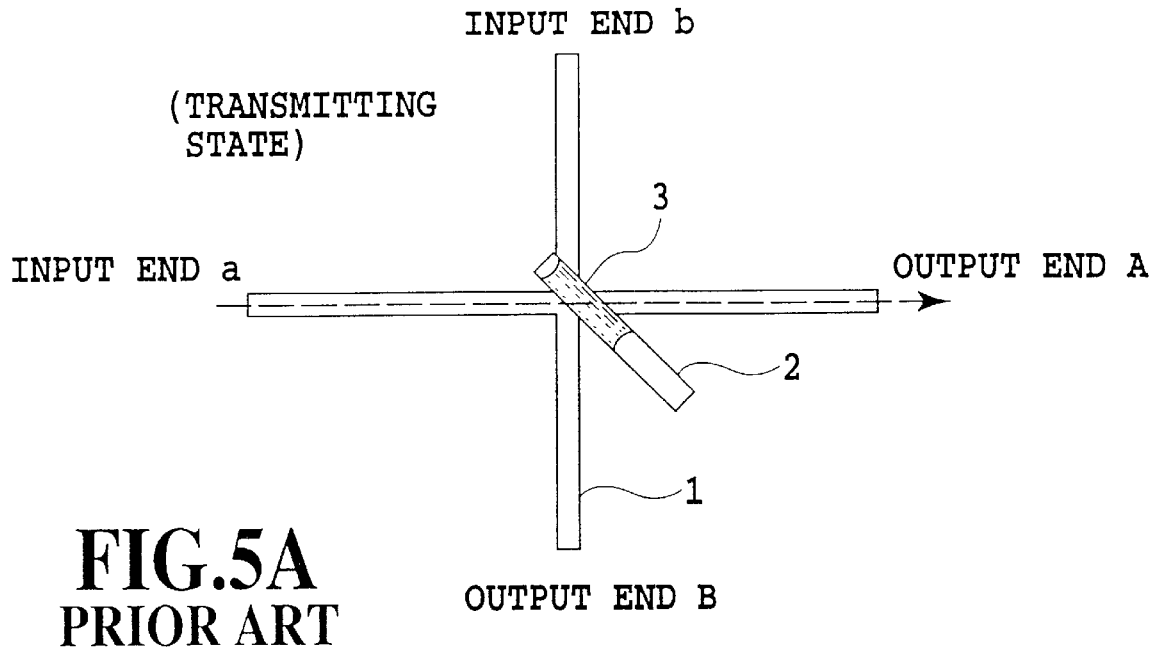
FIG. 5A is a typical diagram showing a state of an light path switching in a transmitting state, in the light path switch constructed by a conventional optical switch.
Figure 5B:
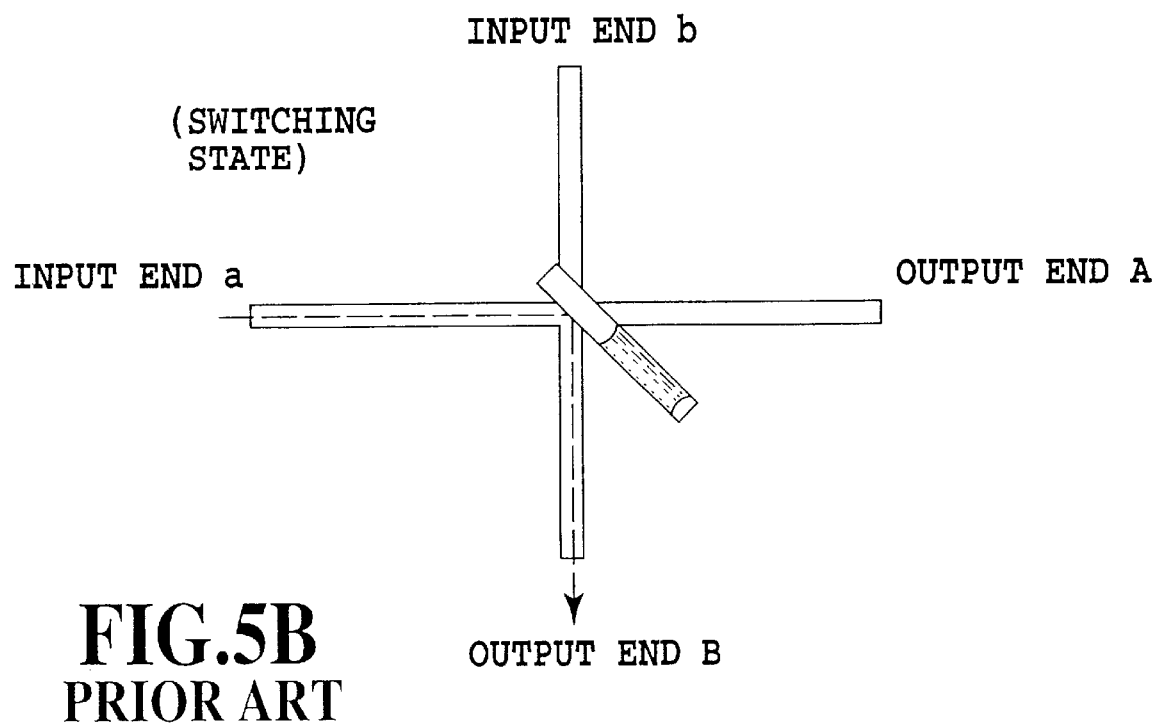
FIG. 5B is a typical diagram showing a state of the light path switching in a transmitting state, in the light path switch constructed by a conventional optical switch.
Figure 6A:
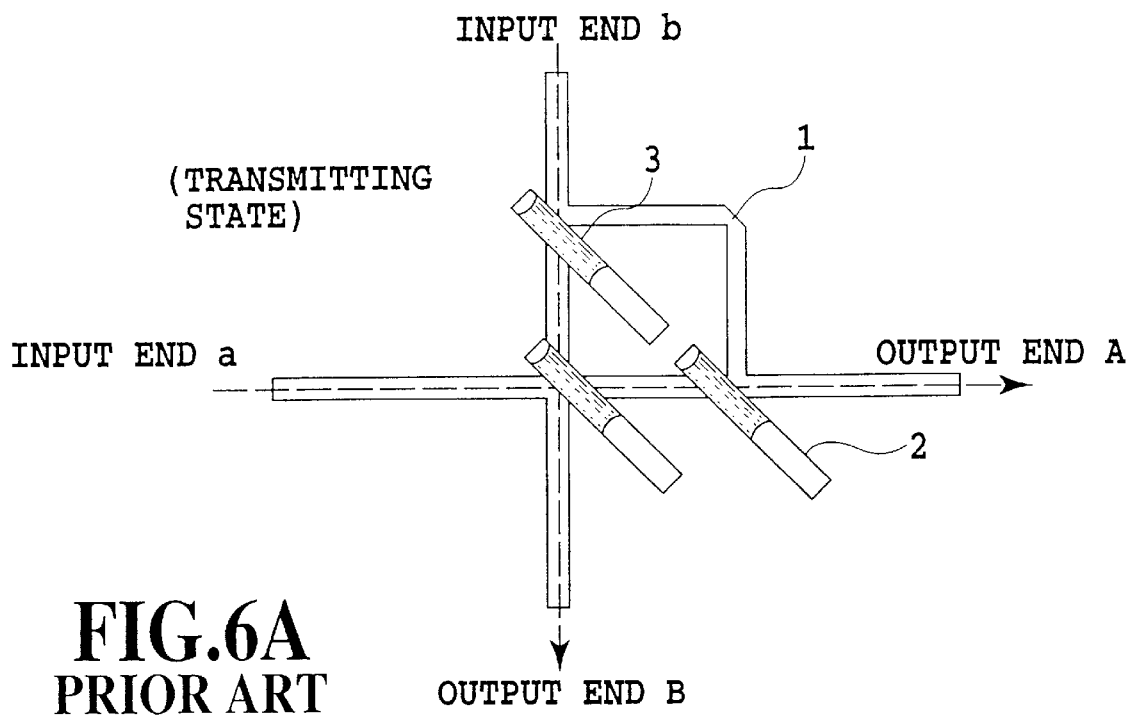
FIG. 6A is a typical diagram showing a 2×2 switching in the transmitting state, in the 2×2 switch constructed by three conventional optical switches.
Figure 6B:
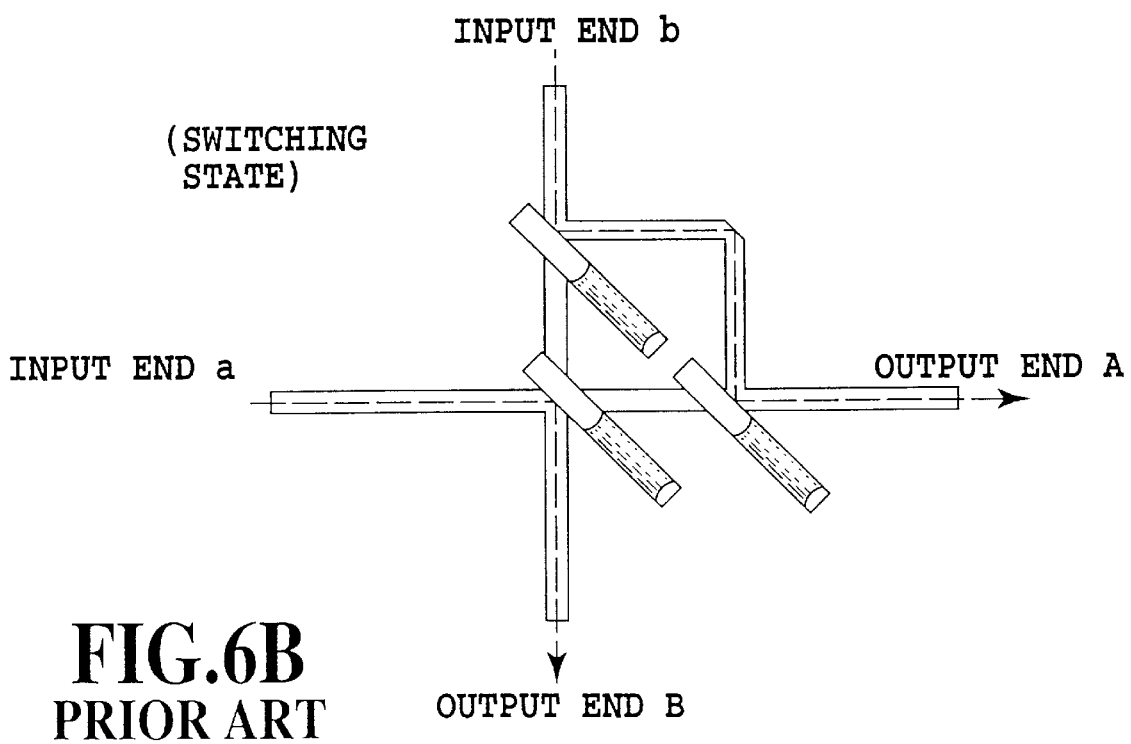
FIG. 6B is a typical diagram showing the 2×2 switching in the switching state, in the 2×2 switch constructed by three conventional optical switches.

FIG. 4 shows a typical configuration of an optical matrix switch comprising a large number of the above described switch elements according to the present invention shown in FIG. 1, wherein the switch elements are arranged in the form of a matrix. In FIG. 4, since the slit 2 for the single-mode optical waveguides is about 200 $\mu$m in length, when the intersecting angle between the optical waveguides 1 and the slit 2 is designed to be, for example, 45 degrees, the slit 2 occupies a length of about 142 $\mu$m in parallel with the optical waveguides 1. Accordingly, optical switches according to the present invention can be arranged at an optical waveguide interval of 250 $\mu$m corresponding to the fiber interval of a general optical fiber ribbon. If, for example, an 8×8 optical matrix switch is formed as shown in FIG. 4, a switch section of an optical matrix switch according to the present invention will be about 2 mm×2 mm in size.

On the contrary, for the conventional TO switches, since the coupling length required for optical switching is about 2 mm, when an 8×8 optical matrix switch is formed, the overall size is 16 mm×16 mm. Therefore, by arranging optical switches according to the present invention in the form of an array or a matrix, a small size but large-scale optical switch with various functions can be materialized.

Although above first embodiment has been described in an example case of the optical switch that switches the light path by moving the refractive index matching liquid sealed in part of the slit, the present invention is not limited to this but is applied to and effective on all optical switches having opposed reflection planes.

(Second Embodiment)

A polarization-insensitive optical part particularly, such an optical switch according to a second embodiment of the present invention, will be described below.

When an incident light is P-polarization, the Goos-Hänchen shift distance ($x_g(p)$) is generally expressed by the following equation (Jiro KOYAMA, Hiroshi NISHIHARA; "Optical Wave Electronics Engineering", Corona Co., Ltd. pp.32–34):

$$x_g(p) = \frac{1}{k_0\sqrt{\left(\frac{k_{1z}}{k_0}\right)^2 - n_2^2\left(\frac{k_{1z}^2}{k_1^2} + \frac{k_{1z}^2}{k_2^2} - 1\right)}} \quad (1)$$

$K_{1z}$, where, is shown by the following equation:

$$k_{1z} = k_1 \sin(90 - \phi) \quad (2)$$

wherein $k_0$ denotes a wave number in the vacuum $k_1$ denotes a wave number in a medium I (corresponding to the core of the optical waveguide system), $k_2$ denotes a wave number in a medium II (corresponding to the reflective structure of the optical waveguide system), $k_{1z}$ denotes a z-axis component of the wave number in the medium I, ø denotes an intersecting angle between optical waveguides and a slit (unit:degrees), and $n_2$ denotes the refractive index of the medium II. In addition, when the incident light is S-polarization, the Goos-Hänchen shift distance ($x_g(s)$) is expressed by the following equation:

$$x_g(s) = \frac{1}{k_0\sqrt{\left(\frac{k_{1z}}{k_0}\right)^2 - n_2^2}} \quad (3)$$

Figure 7:
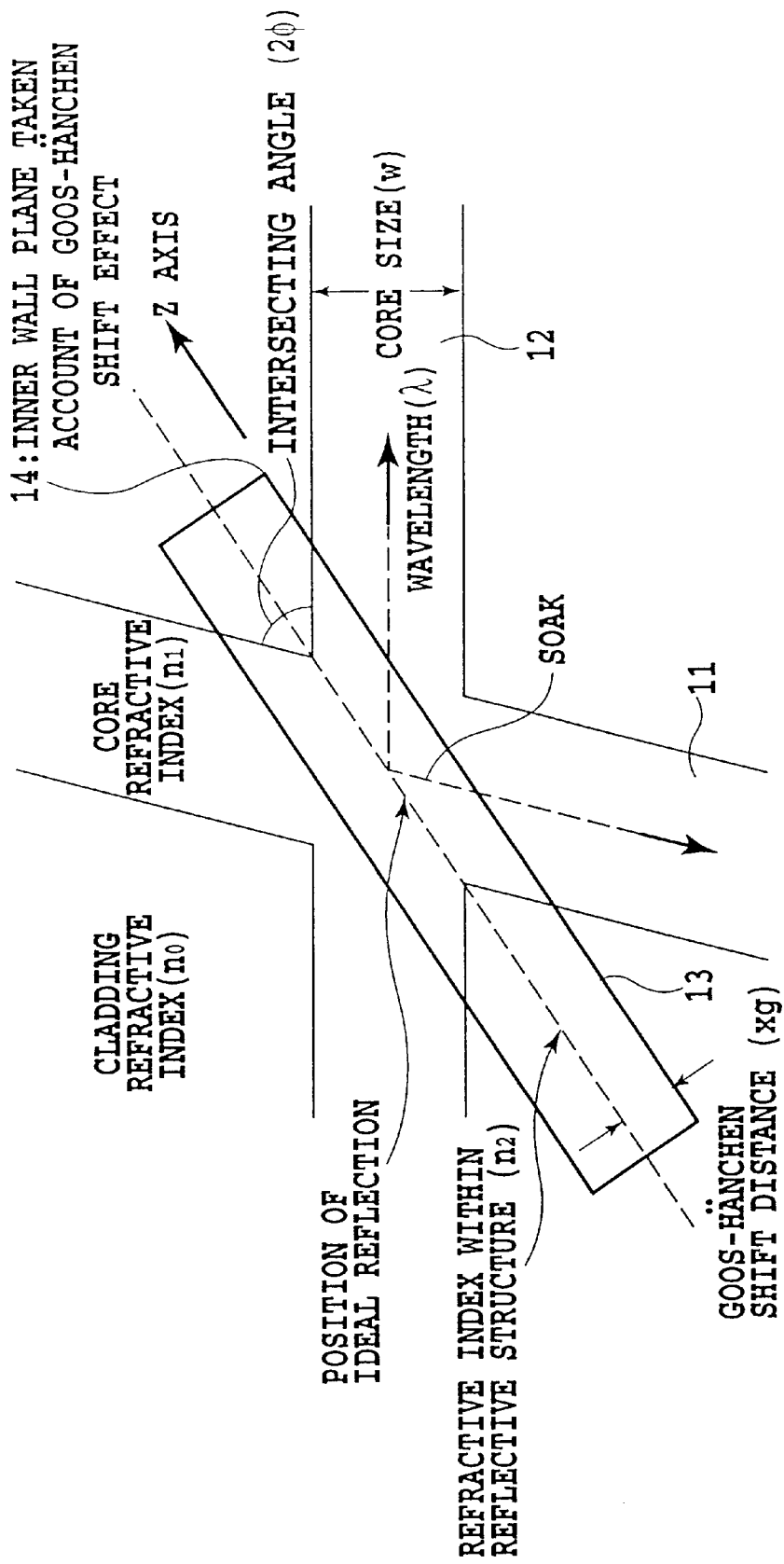
FIG. 7 is a schematic configuration diagram showing a configuration of a neighborhood of a crossing point of a crossing optical waveguide with reflective structure in an optical part, particularly, an optical switch according to a second embodiment of the present invention.

FIG. 7 shows a configuration of a polarization-insensitive optical part, particularly, such a waveguide-type optical switch according to the second embodiment of the present invention. This figure shows the structure of a waveguide-type optical switch at each crossing point which has an m×n optical waveguide formed therein and having a first group of (m) optical waveguides each having a parallel optical axis and a second group of (n) optical waveguides each having a parallel optical axis and crossing the first group of optical waveguides.

In addition, this optical part, particularly, the waveguide-type optical switch has slit-shaped reflective structure 13 formed therein and which can switch incident lights from the first group of optical waveguides 11 to the second group of optical waveguides 12. Cores of the first and second group of optical waveguides 11 and 12 have a refractive index ($n_1$) equivalent to that of glass. Further, the reflective structure 13 has an inner wall surface 14 such that its interior is filled with air in the reflection state of propagation light. Further, the reflective structure 13 has a pair of micro heaters (not shown) at opposite ends thereof so that in the transmission state of propagation light, the interior of the reflective structure 13 is filled with a refractive index matching liquid such as silicone oil which has a refractive index ($n_2$) substantially equal to that of the core.

Equations (1) and (3) are used to calculate the distance of Goos-Hänchen shift for each polarized light in a free space. According to the present invention, however, each polarized light does not travel through the free space but is confined in the optical waveguides 11 and 12 during propagation, as shown in FIG. 7. Thus, compared to the wave number for a free space system, the wave number for the waveguide-type optical switch according to the present invention is determined in the following manner:

First, for calculations of the waveguide-type optical switch according to the present invention, the wave number $k_1$ in the medium I (corresponding to the cores of the optical waveguides) and its z-axis component $k_{1z}$ are calculated by using the following Equations (4) and (5), and using a refractive index ($n_e$) determined by the effective refractive index method:

$$n_e = \beta/k_0 \quad (4)$$

$$k_1 = 2\pi/(\lambda/n_e) \quad (5)$$

The z-axis component of this wave number is also calculated using the above Equations (5) and (2). In the above equations, β represents a propagation constant that is calculated using the following relational expressions (6) to (9):

$$(U/a)^2 = n_1^2 k_0^2 - \beta^2 \quad (6)$$

$$U^2 + W^2 = V^2 \quad (7)$$

$$W = 1.1428V - 0.9960 \quad (8)$$

$$V = \frac{2\pi a}{\lambda}\sqrt{n_1^2 - n_0^2} \quad (9)$$

where V represents a V value, W represents a W value, U represents a U value, a represents a core radius (=w/2), $n_0$ represents the refractive index of a cladding, and $n_1$ represents the refractive index of the core.

The wave number $k_2$ in the medium II is determined as follows:

$$k_2 = 2\pi(\lambda/n_2) \quad (10)$$

Figure 8A:
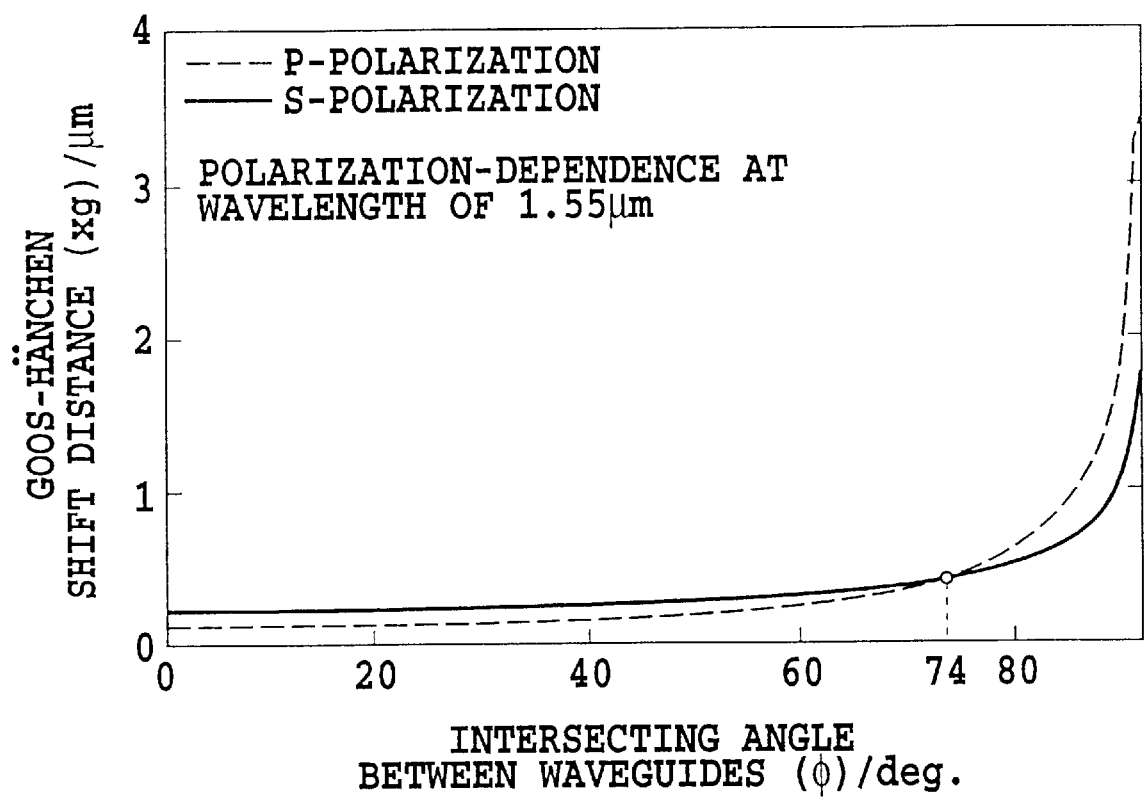
FIG. 8A is a graph showing the polarization dependence at a wavelength of 1.55 $\mu$m in terms of the Goos-Hänchen shift distance for P-polarization and S-polarization vs. the intersecting angle between the waveguide (2$\phi$)
Figure 8B:
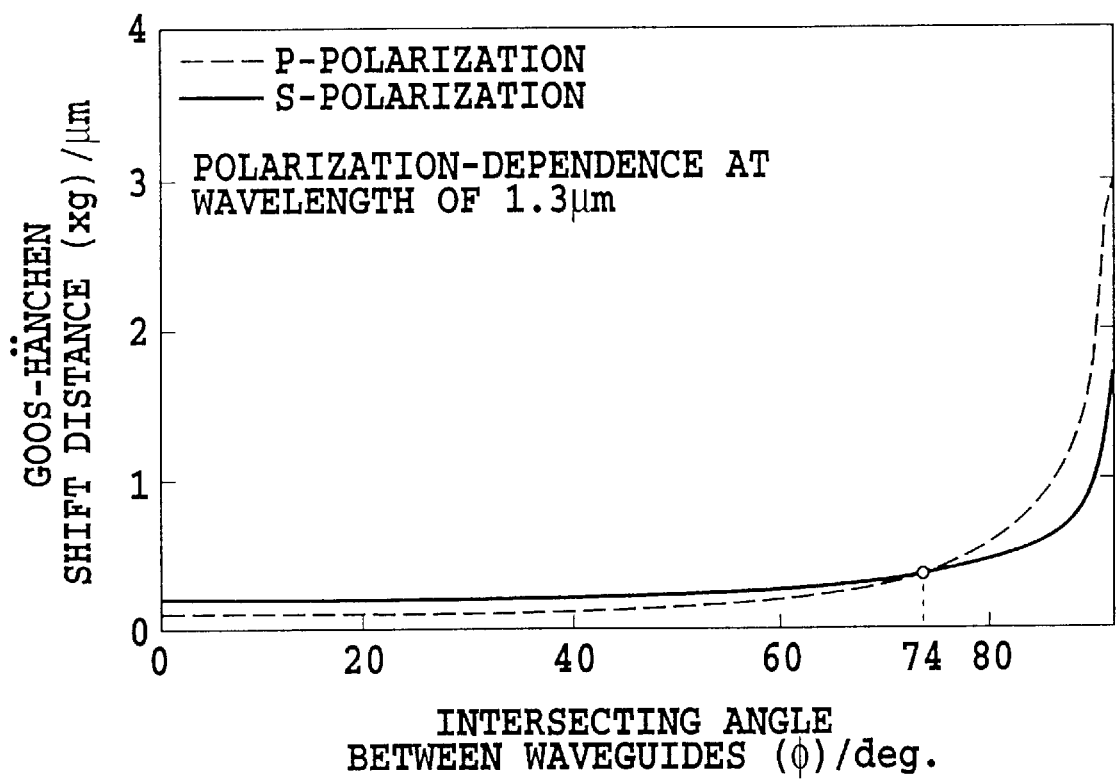
FIG. 8B is a graph showing the polarization dependence at a wavelength of 1.3 $\mu$m in terms of the Goos-Hänchen shift distance for P-polarization and S-polarization vs. the intersecting angle between the waveguide (2$\phi$)

As representative examples, FIGS. 8A and 8B show results of calculations for the case where for each of P-polarization and S-polarization, the input optical wavelength is 1.559 μm or 1.39 μm, the refractive index of the cladding $n_0$ is 1.45, the refractive index of the core $n_1$ is 1.45435, the core radius a is 4 μm, and the refractive index of air $n_2$ is 1.0. FIG. 8A shows the polarization dependence at a wavelength of 1.559 μm in terms of the Goos-Hänchen shift distance of P-polarization and S-polarization plotted vs. the intersecting angle between the waveguide (2φ). FIG. 8B similarly shows the polarization dependence at a wavelength of 1.3 μm.

Figure 9A:
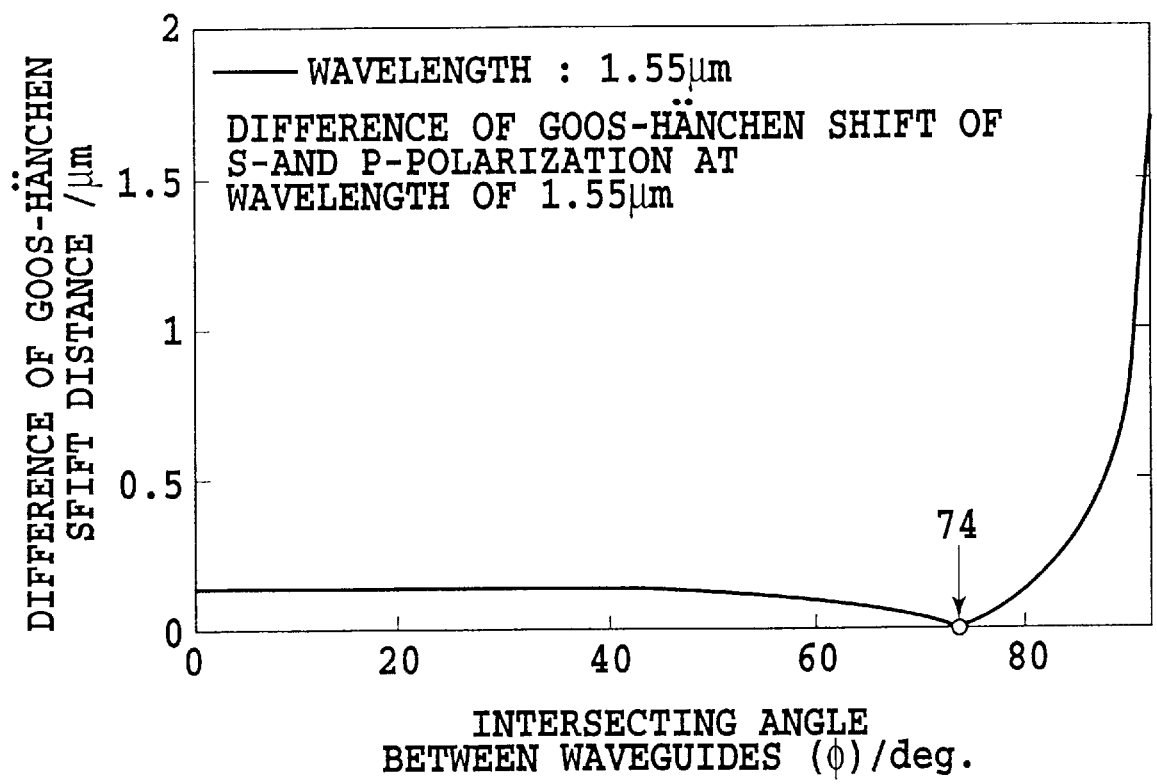
FIG. 9A is a graph with a plotting curve showing difference (absolute value) of the Goos-Hänchen shift distance between P-polarization and S-polarization at a wavelength of 1.55 $\mu$m vs. the intersecting angle between the waveguide (2$\phi$)
Figure 9B:
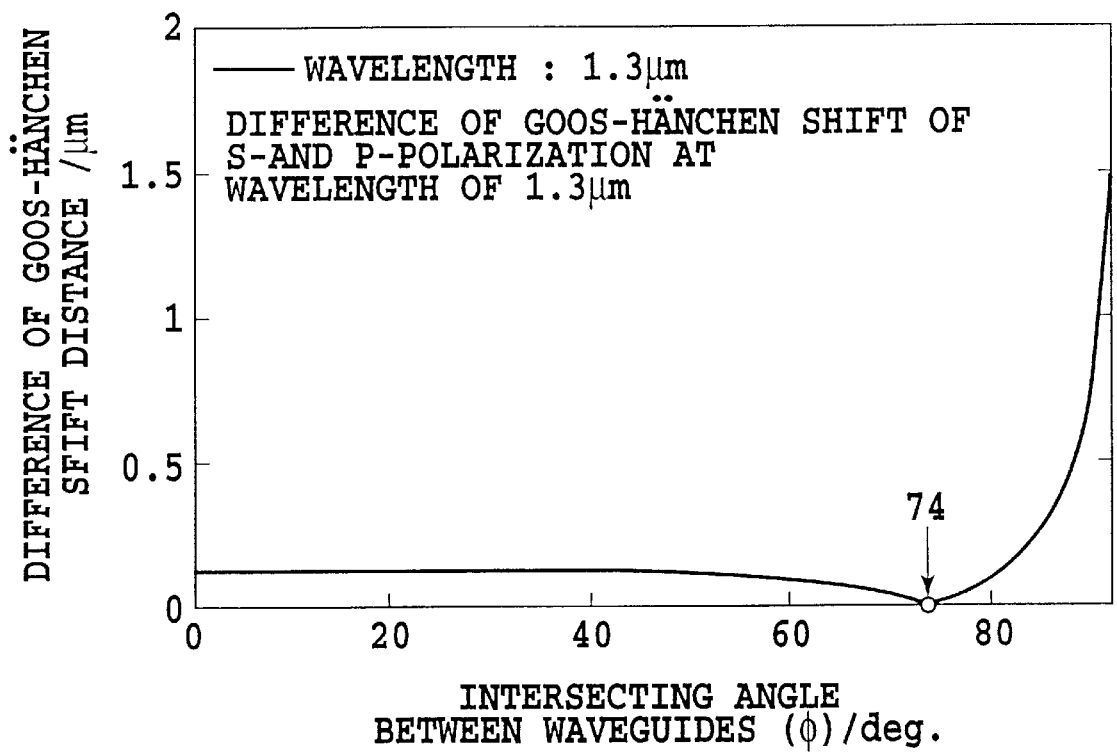
FIG. 9B is a graph with a plotting curve showing difference (absolute value) in the Goos-Hänchen shift distance between P-polarization and S-polarization at a wavelength of 1.3 $\mu$m vs. the intersecting angle between the waveguide (2$\phi$)

FIGS. 9A and 9B show difference (absolute value) of the Goos-Hänchen shift distance between P-polarization and S-polarization plotted as a function of the intersecting angle between the waveguides (2φ). These figures indicate that the difference in the Goos-Hänchen shift distance between P-polarization and S-polarization, that is the polarization dependence is totally eliminated when the intersecting angle between the optical waveguides is close to 74 degrees.

Figure 10A:
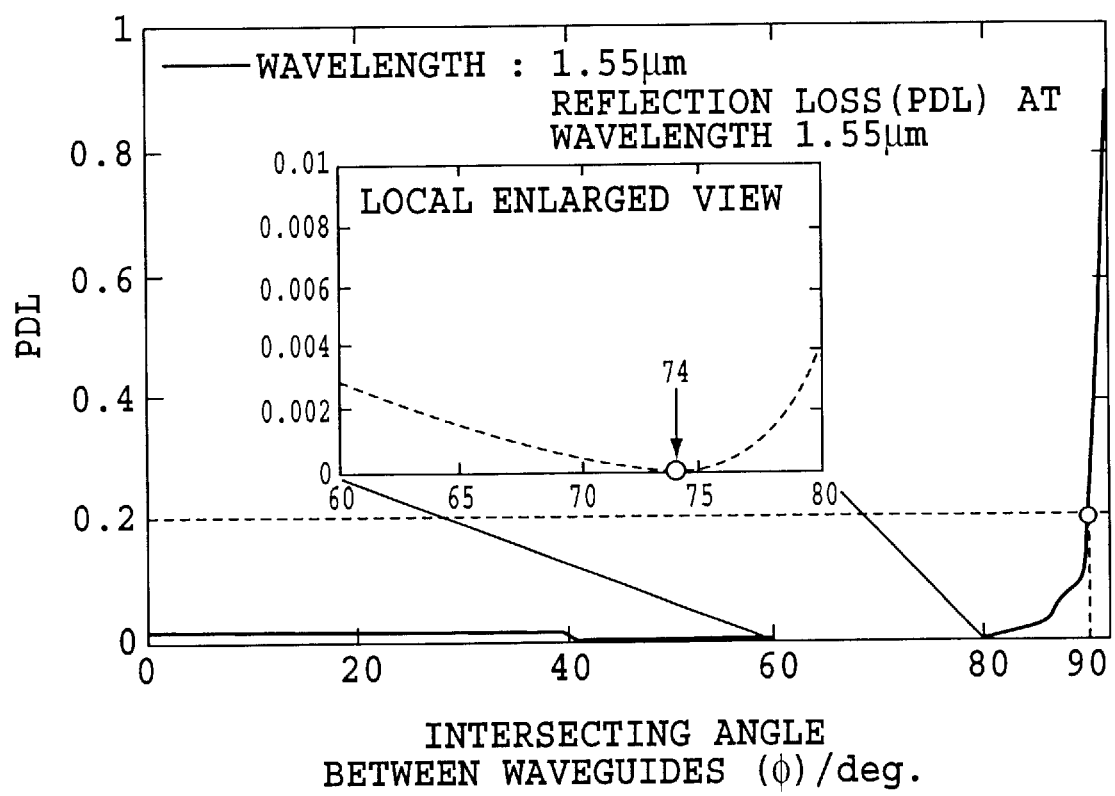
FIG. 10A is a graph showing a representative example of the present invention wherein the difference of the Goos-Hänchen shift distance between P-polarization and S-polarization in FIG. 9A are converted into a polarization dependence loss (PDL)
Figure 10B:
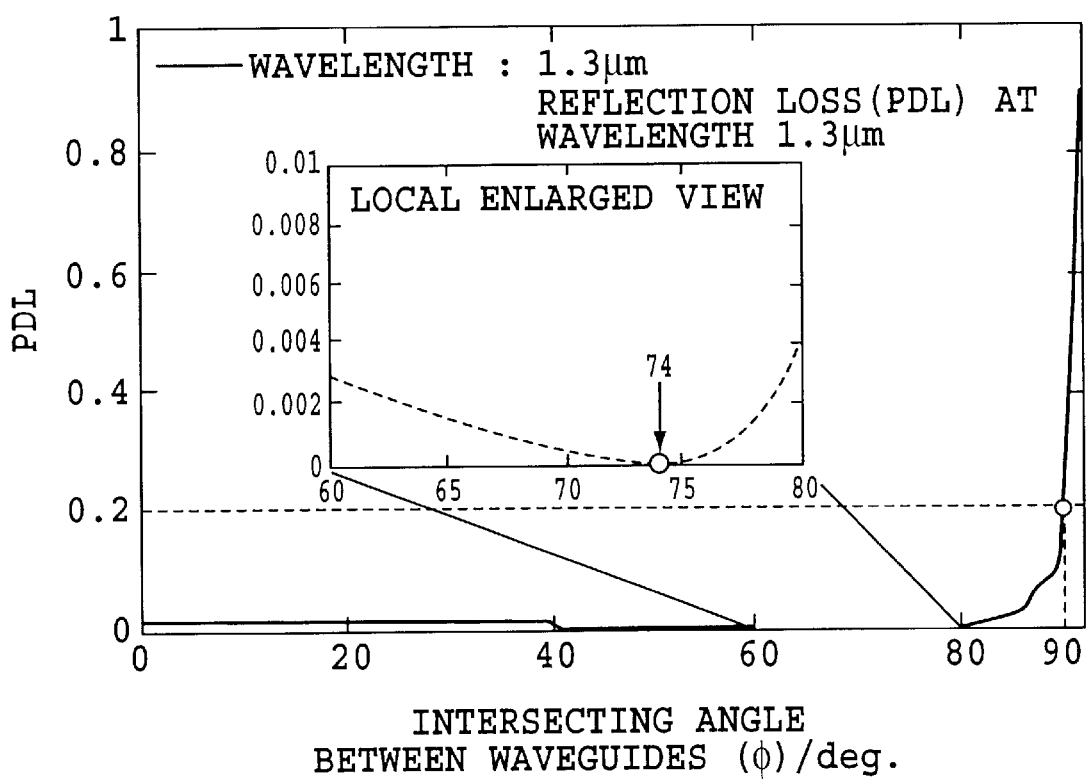
FIG. 10B is a graph showing a representative example of the present invention wherein the differences of the Goos-Hänchen shift distance between P-polarization and S-polarization in FIG. 9B are converted into PDL.

A representative example of the present invention is shown in FIGS. 10A and 10B. In these figures, the differences in the Goos-Hänchen shift distance between P-polarization and S-polarization in FIGS. 9A and 9B are converted into PDL. As shown in FIGS. 10A and 10B, when the intersecting angle between the optical waveguides (2φ) is less than 90 degrees, since the PDL is 0.2 dB or less in both wavelength regions having both propagation wavelengths of 1.55 and 1.3 μm, the polarization dependence is sufficiently negligible.

Here, the intersecting angle between the optical waveguides (2φ) is preferably between 50 and 80 degrees, more preferably between 70 and 75 degrees, and much more preferably between 73 and 74 degrees.

The PDL shown in FIGS. 10A and 10B is obtained through conversion of the difference in the Goos-Hänchen shift distance, which corresponds to the difference in the Goos-Hänchen shift distance between P-polarization and S-polarization individually.

In addition, with the optical part according to the present invention, particularly, the waveguide-type optical switch, by limiting the sectional dimensions of the cores of the first and second groups of optical waveguides 11 and 12 to 8.0 μm×8.0 μm and limiting the relative refractive index difference between the core and the cladding to range 0.15 to 0.25%, or by limiting the relative refractive index difference between the cores and the claddings of first and second groups of optical waveguides 11 and 12 to 0.30% and limiting the sectional dimensions of the core width w between 6.7 μm×6.7 μm and 7.0 μm×7.0 μm, a waveguide type optical part, particularly, an optical switch can be provided which is insensitive to polarization and which can reduce the wavelength dependence caused by an alignment error that may occur during formation of the reflective structure 13 or an axial alignment error that may occur during connecting of the optical waveguides with optical fibers (Tomomi SAKATA et al. "Waveguide Type Optical Part Having Insensitive To Polarization", Japanese Patent Application No. 10-238599 (1998) [Official Gazette of Japanese Patent Application Laid-open No. 2000-066047 (2000)]).

Although the second embodiment has been described in conjunction with the matrix type waveguide optical switch, the present invention is not limited to this but is applicable, for example, as a unitary optical switch, of a light path-polarizing optical part or a reflector that is free from the refractive index matching liquid.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. An optical switch comprising:
    a first and second optical waveguide that cross each other; and
    a slit including a first and a second side wall opposed to each other, the slit diagonally cutting a crossing point of said first and second optical waveguides, said slit has a smaller width than cores of said first and second optical waveguides, and a center line of said slit is formed on a bisector of an interior angle between both center lines of said first and second optical waveguides,
    wherein when an optical transmitting substance, in which a light inputted to said first and second optical waveguides can pass through, is held at the crossing point in said slit, the light inputted to said first and second optical waveguides is output from said first and second optical waveguides, respectively, and
    when an optical reflecting substance having a function of reflecting the light is held at the crossing point in said slit, the first light inputted to said first optical waveguide is reflected on the first side wall of said slit near the input end of the first light, and then the first light is inputted into said second optical waveguide and outputted from it, whereas the second light inputted in said second optical waveguide is reflected on the second side wall of said slit near the input end of the second light, and then the second light is inputted into said first optical waveguide and outputted from it, whereby the destination of the light is switched.

2. An optical switch according to claim 1, wherein said first side wall of said slit is located on a side of said slit in which said first light is inputted relative to said bisector of said interior angle, and is located at a position corresponding to plus a value of 4 microns or less and the Goos-Hänchen shift distance measured when said first light is reflected by said slit, and
    said second side wall of said slit is located on the side of said slit opposite the first sidewall and in which said second light is inputted relative to the bisector of the interior angle, and is located at a position corresponding to plus a value of 4 microns or less and the Goos-Hänchen shift distance measured when said second light is reflected by said slit.

3. An optical switch according to claim 2 wherein said slit having said first and second side walls is disposed at all or some of the crossing points between each of a first group of parallel optical waveguides comprising a plurality of said first optical waveguides and each of a second group of parallel optical waveguides comprising a plurality of said second optical waveguides, the first and second groups of parallel optical waveguides crossing each other within an identical plane.

4. An optical switch according to claim 1, wherein said first side wall of said slit is located on a side of said slit in which said first light is inputted relative to said bisection of said interior angle, and is located at a position corresponding to plus a value of 1.5 microns or less and the Goos-Hänchen shift distance measured when said first light is reflected by said slit, and
    said second side wall of said slit is located on a side of said slit opposite said first side wall and in which said second light is inputted relative to the bisector of the interior angle, and is located at a position corresponding to plus a value of 1.5 micron or less and the Goos-Hänchen shift distance measured when said second light is reflected by said slit.

5. An optical switch according to claim 4 wherein said slit having said first and second side walls is disposed at all or some of the crossing points between each of a first group of parallel optical waveguides comprising a plurality of said first optical waveguides and each of a second group of parallel optical waveguides comprising a plurality of said second optical waveguides, the first and second groups of parallel optical waveguides crossing each other within an identical plane.

6. An optical switch according to claim 1, wherein said first side wall of said slit is located on a side of said slit in which said first light is inputted relative to said bisector of said interior angle, and is located at a position corresponding to the Goos-Hänchen shift distance measured when said first light is reflected by said slit, and said second side wall of said slit is located on a side of said slit opposite said first side wall and in which said second light is inputted relative to the bisector of the interior angle, and is located at a position corresponding to the Goos-Hänchen shift distance measured when said second light is reflected by said slit.

7. An optical switch according to claim 6 wherein said slit having said first and second side walls is disposed at all or some of the crossing points between each of a first group of parallel optical waveguides comprising a plurality of said first optical waveguides and each of a second group of parallel optical waveguides comprising a plurality of said second optical waveguides, the first and second groups of parallel optical waveguides crossing each other within an identical plane.

8. An optical switch according to claim 1 wherein said slit having said first and second side walls is disposed at all or some of the crossing points between each of a first group of parallel optical waveguides comprising a plurality of said first optical waveguides and each of a second group of parallel optical waveguides comprising a plurality of said second optical waveguides, the first and second groups of parallel optical waveguides crossing each other within an identical plane.

9. An optical switch according to claim 1, wherein said slit having said first and second side walls is disposed at all or some of the crossing points between each of a first group of parallel optical waveguides comprising a plurality of said first optical waveguides and each of a second group of parallel optical waveguides comprising a plurality of said second optical waveguides, the first and second groups of parallel optical waveguides crossing each other within an identical plane.

10. A polarization insensitive optical part comprising a crossing optical waveguide with a reflecting structure that is an m×n optical waveguide including a first group of (m) optical waveguides each having a parallel optical axis, and a second group of (n) optical waveguides each having a parallel optical axis and crossing the first group of optical waveguides at a crossing point, the crossing optical waveguide having a slit that can switch optical signals from the first group of optical waveguides to the second group of optical waveguides, said slit diagonally cutting the crossing point between said first group of optical waveguides and said second group of optical waveguides, a center line of said slit is formed on a bisector of an interior angle between center lines of said first and second optical waveguides, cores of the first and second groups of waveguides having a refractive index equivalent to that of glass, the slit having its interior filled with air during reflection, wherein an intersecting angle between an optical axis of said first group of optical waveguides and an optical axis of said second group of optical waveguides (2ø) has a value at which the Goos-Hänchen shift distance (xg(p)) measured when P-polarization light is incident as determined by the following Equation (1) is equal to the Goos-Hänchen shift distance (xg(s)) measured when S-polarization light is incident as determined by the following Equation (3), or a value close to the value:

$$x_g(p) = \frac{1}{k_0\sqrt{\left(\frac{k_{1z}}{k_0}\right)^2 - n_2^2 \left(\frac{k_{1z}^2}{k_1^2} + \frac{k_{1z}^2}{k_2^2} - 1\right)}} \quad (1)$$

wherein $K_{1z}$ is shown by the following equation:

$$k_{1z} = k_1 \sin(90 - \phi) \quad (2)$$

$$x_g(s) = \frac{1}{k_0\sqrt{\left(\frac{k_{1z}}{k_0}\right)^2 - n_2^2}} \quad (3)$$

where $k_0$ denotes a wave number in the vacuum, $k_1$ denotes a wave number in each of the cores of said first and second groups of optical waveguides, $k_2$ denotes a wave number in said slit, $k_{1z}$ denotes a z-axis component of the wave number in said core, ø denotes an intersecting angle between the optical waveguide and the reflection walls on both sides of said slit, and $n_2$ denotes the refractive index in the interior of said reflective structure during reflection.

11. An optical part according to claim 10 wherein said intersecting angle between said first group of optical waveguides and said second group of optical waveguides is between 0 and less than 90 degrees.

12. An optical part according to claim 10 wherein said intersecting angle between said first group of optical waveguides and said second group of optical waveguides is substantially between 73 and 74 degrees.

13. An optical part according to claim 12, wherein said optical part is an optical switch, and
when an optical transmitting substance, in which a light inputted to said first and second optical waveguides can pass though, is held at the crossing point in said slit, the light inputted to said first and second optical waveguides is output from said first and second optical waveguides, respectively.

14. An optical part according to claim 10 wherein the cores of said first and second groups of optical waveguides have sectional dimensions of 8.0 μm×8.0 μm, and the relative refractive index difference between the cores and claddings is between 0.15 and 0.25%.

15. An optical part according to claim 10 wherein the relative refractive index difference between the cores and claddings of said first and second groups of optical waveguides are 0.30%, and wherein the cores have sectional dimensions between 6.7 μm×6.7 μm and 7.0 μm×7.0 μm.

16. An optical part according to claim 10, wherein said optical part is an optical switch, and
when an optical transmitting substance, in which a light inputted to said first and second optical waveguides can pass though, is held at the crossing point in said slit, the light inputted to said first and second optical waveguides is output from said first and second optical waveguides, respectively.

17. An optical part according to claim 10 wherein said m first optical waveguides are a single first optical waveguide, said n second optical waveguides are a single second optical waveguide, and said m×n optical waveguide is a 1×1 optical waveguide.

18. An optical switch, comprising:
first and second optical waveguides arranged to intersect each other at a crossing point, the first and second waveguides each having a core and a center line;
a slit extending diagonally through the crossing point and having first and second side walls arranged opposed to each other, the slit having a central axis that coincides with a bisector of an interior angle between the center lines of the first and second optical waveguides; and
means for arranging an optical transmitting substance and an optical reflecting substance in the slit at the crossing point;
whereby, when the optical transmitting substance is arranged in the slit at the crossing point, light inputted to the first and second optical waveguides is outputted by the first and second optical waveguides, respectively, and when the optical reflecting substance is arranged at the crossing point, light inputted to the first optical waveguides is reflected on the first side wall of the slit into the second waveguide and is outputted by the second waveguide and light inputted to the second optical waveguide is reflected on the second side wall of the slit into the first waveguide and is outputted by the first waveguide.

* * * * *